Figure 1:
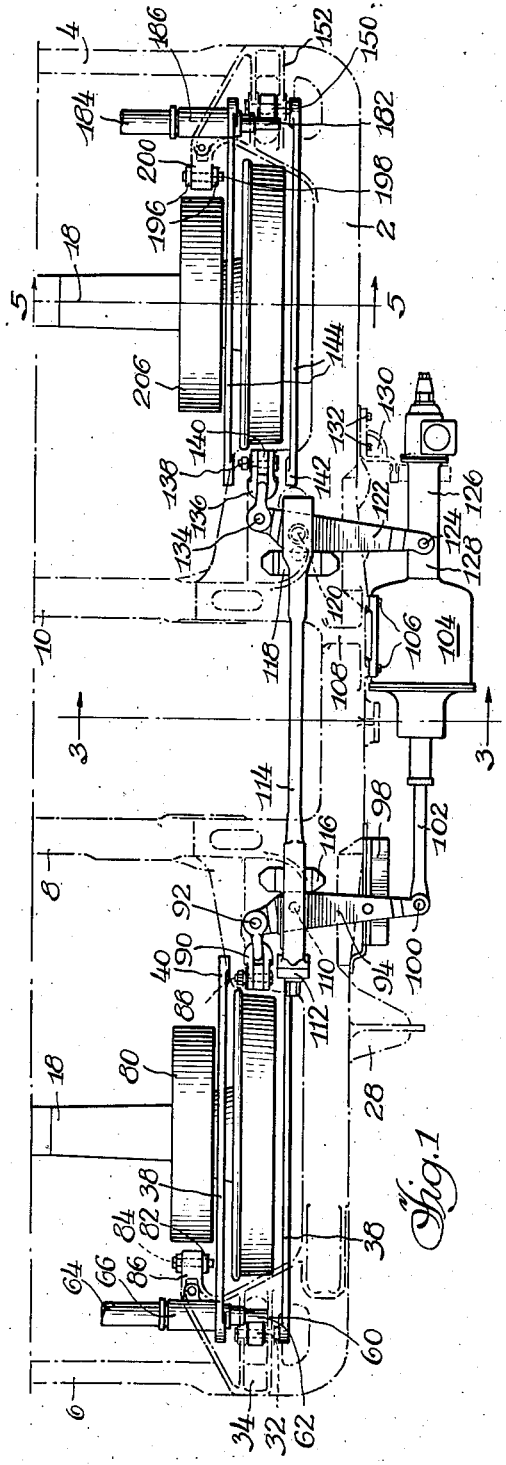

Oct. 16, 1945.  R. C. PIERCE  2,386,907
BRAKE
Filed May 21, 1943  3 Sheets-Sheet 1

INVENTOR.
Raymond C. Pierce
BY
Atty

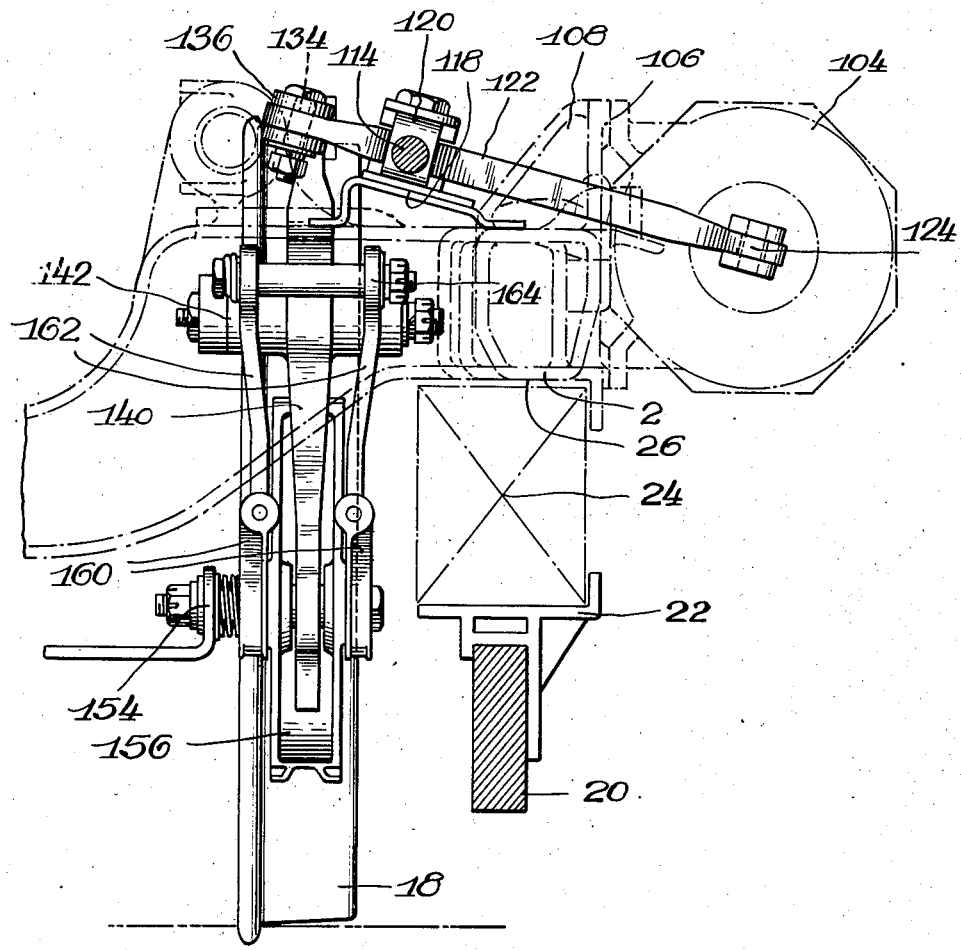

Oct. 16, 1945.    R. C. PIERCE    2,386,907
BRAKE
Filed May 21, 1943    3 Sheets-Sheet 3
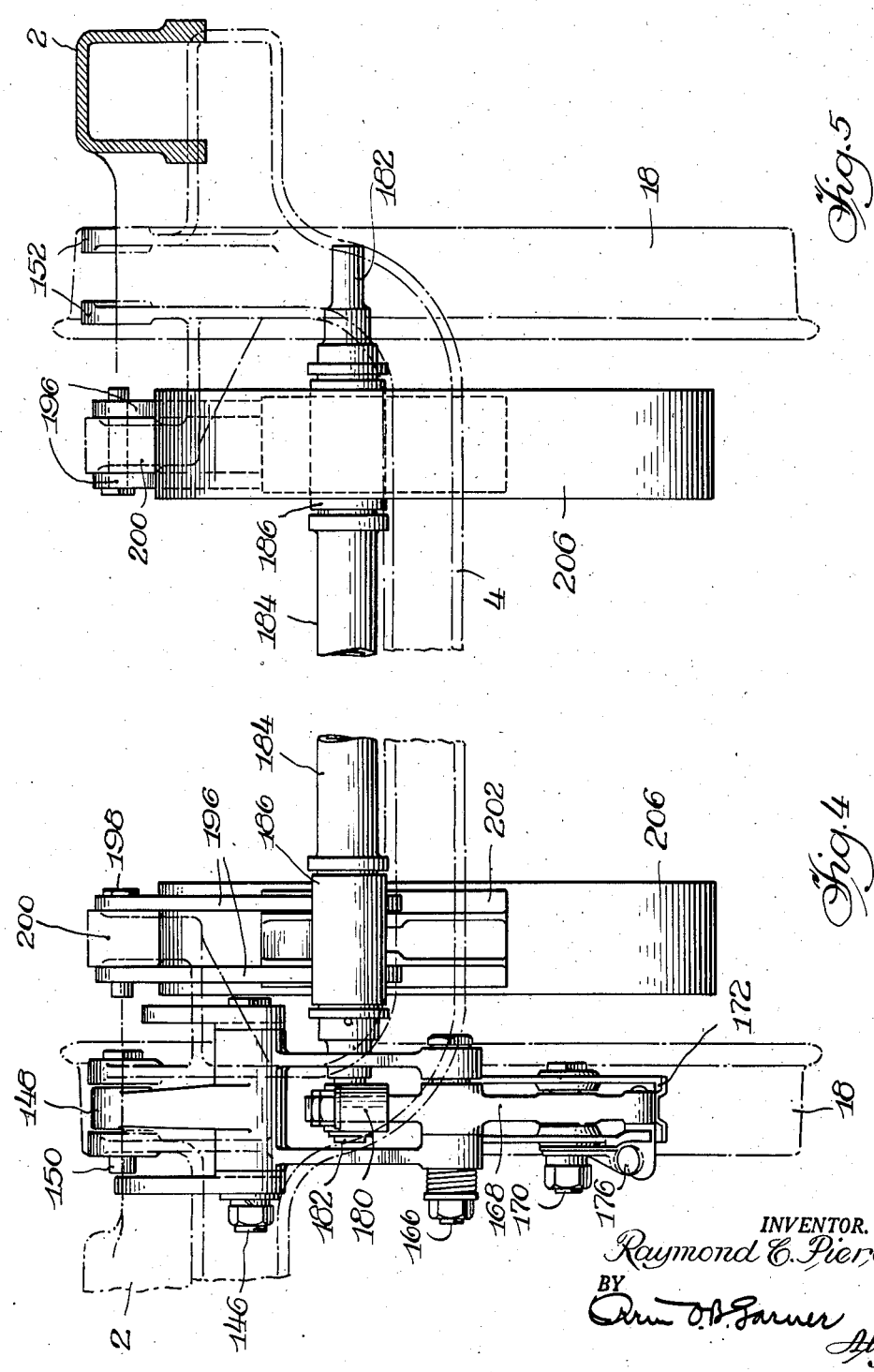

Patented Oct. 16, 1945

2,386,907

UNITED STATES PATENT OFFICE 2,386,907

BRAKE

Raymond C. Pierce, Chicago, Ill.

Application May 21, 1943, Serial No. 487,851

27 Claims. (Cl. 188—56)

My invention relates to railway brake rigging and more particularly to a so-called "Duplex" or "Duo-Simplex" type thereof which utilizes wheel tread brakes and off-wheel brakes in combination. The general object of my invention is to devise a novel and practicable form of brake rigging for a railway car truck in which the braking pressures may be suitably and conveniently distributed between the tread surfaces of the wheels and a drum mounted on each axle. This contemplates the provision of a novel rigging suitable for high speed operation in which either metal or composition brake shoes may be applied to the drums and the wheels. Under modern high speed conditions greater braking and correspondingly greater heat dissipation is required than can be provided by wheel tread brakes alone. My purpose is to provide braking means that will be sufficient for high speed operation in which an equalizing arrangement will be afforded between the brake shoes which bear against the drums and those which bear against the wheel tread and, further, to compensate for uneven wear which necessarily occurs in such braking arrangements. This equalization I secure by varying the lever ratios as required so that within reasonable limits any desired percentage pressure may be secured on either the tread or the drum shoes.

A more specific object of my invention is to devise a novel arrangement of "Duplex" brake rigging wherein power means may be mounted on the side frame of each truck for operation of the rigging at one side thereof and wherein the rigging for the off-wheel brakes may be beam type and for the on-wheel brakes beamless type, all of said brakes being actuated by a single power means at each side of the truck.

A different object of my invention is to devise a novel form of brake rigging such as that above mentioned wherein clasp brake means may be utilized for the tread brakes and single shoe brakes for the associated off-wheel brakes, in other words, an arrangement in which the tread brake may be mounted at opposite sides of each wheel and the off-wheel brakes mounted at only one side of each axle.

A still more specific object of my invention is to devise a novel braking arrangement such as described in which interconnected live and dead brake levers may be supported at opposite sides of each wheel, one of said levers actuating wheel tread brakes and the other of said levers actuating tread brakes as well as off-wheel brakes, and further in which an equalizing arrangement is set up to properly distribute the forces between the two types of brakes at one side of the axle.

Still another object of my invention is to devise a brake arrangement such as that described wherein the wheel tread shoes may have metal to metal braking surfaces and the off-wheel shoes may be formed of composition material; and, further, wherein the composition shoes may be afforded such support as to permit their equalization with respect to the brake drum against which they seat and so to avoid uneven wear.

Figure 2:
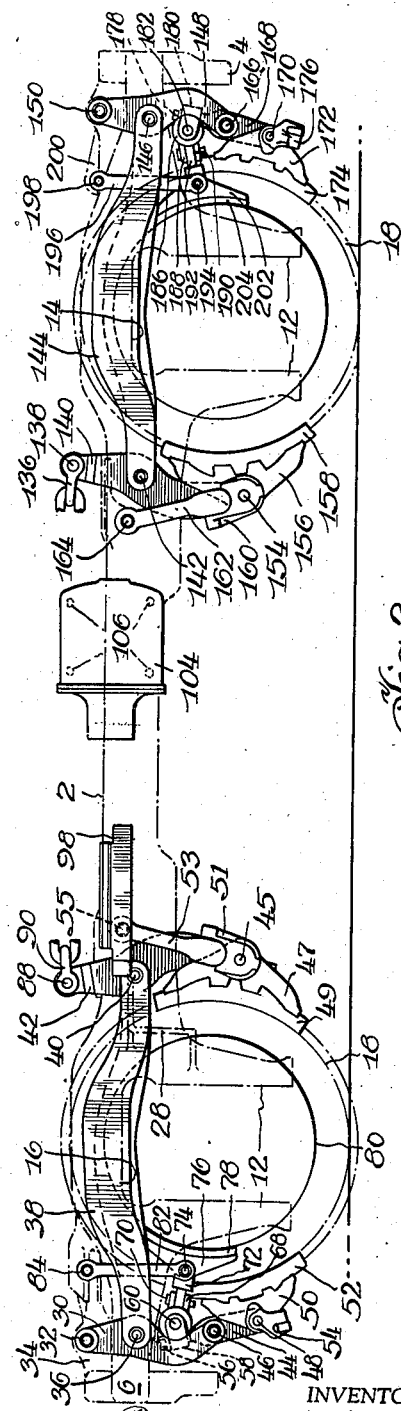

In the drawings, Figure 1 is a top plan view of one half of a railway car truck embodying my invention, the structure of the truck and brake arrangement being substantially identical at opposite sides of the truck and the showing therefore including only one half thereof. Figure 2 is a side elevation of the truck and brake arrangement shown in Figure 1. Figure 3 is a sectional view taken approximately in the vertical transverse plane bisecting the truck as indicated by the line 3—3 of Figure 1. Figure 4 is an end view of the truck and brake arrangement shown in Figures 1 and 2, taken from the right as seen in those figures, and Figure 5 is a further sectional view taken in the vertical transverse plane adjacent the center line of one axle approximately as indicated by the line 5—5 of Figure 1. In each of the views certain details may be omitted where they are more clearly shown in other figures.

In detail my novel arrangement is shown as applied to a railway car truck comprising a side member 2, end rails 4 and 6, and spaced transoms 8 and 10 between which may be supported in convenient conventional manner a bolster affording support for one end of a car body. The side member 2 may be formed with the usual pedestal means 12, 12 at each end thereof defining the respective pedestal openings 14 and 16 for reception of journal boxes associated with journal means on the adjacent ends of the wheel and axle assemblies 18, 18. The journal boxes (not shown) may afford support for an equalizer 20 (Figure 3) extending therebetween upon which may be supported a spring seat 22 carrying the spring group diagrammatically indicated at 24 upon which the side frame may rest as at 26 in usual manner.

The side member 2 as illustrated may be equipped with a thrust bracket 28 (Figure 1, left) for a special purpose not related to this invention.

My novel brake rigging may comprise the dead brake lever 30 (Figure 2, left) fulcrumed as at 32 from the bracket 34 formed as an integral part of the frame structure adjacent the juncture of the end rail 6 and the side rail 2. The dead lever 30 may have a pivotal connection intermediate its ends as at 36 to the paired inboard and outboard straps 38, 38 which extend over the axle and have pivotal connection as at 40 to the live truck lever 42. Below its connection at 36 with the overwheel straps the dead lever 30 may have a bifurcated form between the legs of which may be received the equalizer lever 44 to an intermediate point of which said dead lever may have pivotal connection as at 46. The lower end of the equalizing lever 44 may have pivotal connection as at 48 with the brake head 50 supporting the brake shoe 52 for engagement with the periphery of the adjacent wheel and the connection at 48 may be made adjustable as by balancing means 54 of well known form. The upper trunnion end of the equalizing lever 44 may have pivotal connection as at 56 to the clevis-like member 58 mounted thereon and the opposite end of said clevis 58 may have pivotal connection as at 60 with the trunnion end 62 of the brake beam 64, the opposite end of which is similarly mounted at the other side of the truck. The connection at 56—58—60 is therefore universal in character. Adjacent the end of the beam 64 may be mounted against lateral movement thereon the sleeve 66 affording support for the bracket 68 and said bracket may have pivotal connection as at 70 (Figure 2, left) with the link 72 to which may be pivotally connected as at 74 the brake head 76 supporting the composition brake shoe 78 for peripheral engagement with the adjacent brake drum 80. Also connected at the pivot point 74 may be the hanger 82, the upper end of which may be hung as at 84 from the inturned end 86 of the before-mentioned bracket 34.

The upper end of the live truck lever 42 may have pivotal connection as at 88 with the clevis means 90 and the opposite end of said clevis means may have pivotal connection as at 92 with the live cylinder lever 94 which may be afforded slidable support adjacent its outer end from the bracket 98 secured on the side rail 2. The outer end of the live cylinder lever 94 may have pivotal connection as at 100 with the piston rod 102 of the power means or air cylinder 104. The cylinder 104 may be supported as at 106, 106 from the bracket 108 formed as an integral part of the adjacent side rail 2.

At the lower end the live truck lever 42 may be pivotally connected as at 45 to the brake head 47 supporting the brake shoe 49, said brake head connection being made properly adjustable by the balancing means 51 (Figure 2). Also connected at the pivot point 45 may be the lower end of the hanger 53 whose upper end may be hung as at 55 from the truck frame.

Intermediate the ends of the live cylinder lever 94 may be pivotally and adjustably connected as at 110 the slack adjuster 112 mounted on the end of the pull rod 114, said pull rod being afforded slidable support and guidance by the bracket 116 mounted on the frame adjacent the juncture of the side rail 2 and the transom 8. The opposite end of the pull rod 114 may be similarly guided as at 118 and may have pivotal and adjustable connection as at 120 to the dead cylinder lever 122, the outboard end of which may have pivotal and adjustable connection as at 124 to the slack adjuster 126 supported from the brake cylinder as at 128 and from the bracket 130 secured on the side rail 2 as at 132, 132.

The inboard end of the dead cylinder lever 122 may have pivotal connection as at 134 to the clevis means 136 whose opposite end may have pivotal connection as at 138 to the live truck lever 140 and intermediate the ends of said live truck lever 140 may be pivotally connected as at 142 the over-axle paired inboard and outboard straps 144, 144 whose opposite ends may have pivotal connection as at 146 to the dead truck lever 148, the upper end of which may be pivotally fulcrumed as at 150 from the bracket 152 integrally formed on the frame at the juncture of the end rail 4 and the side member 2.

The lower end of the live truck lever 140 may afford pivotal support as at 154 for the brake head 156 supporting the brake shoe 158, and the brake head connection at 154 may be adjustably maintained by balancing means 160 of well known form. Also connected at the pivot point 154 may be the lower ends of the paired hangers 162, 162 (Figure 3) and the upper ends thereof may be hung as at 164 from the truck frame.

The lower end of the dead truck lever 148 may have pivotal connection as at 166 intermediate the ends of the equalizer 168 and the lower end of said equalizer may afford pivotal support as at 170 for the brake head 172 carrying the brake shoe 174, the connection at 170 being made adjustable as by the balancing means 176. Below the strap connecting point 146 the dead truck lever 148 may be of bifurcated form and the upper end of the equalizer 168 may extend between the inboard and outboard legs thereof as well illustrated in the end view of Figure 4. The upper trunnion end of the equalizer 168 may have swivel connection as at 178 with the clevis-like member 180, the opposite end of which may have pivotal connection as at 182 with the trunnion end of the beam 184. Mounted on the adjacent end of the beam 184 against lateral movement thereon may be the sleeve member 186 with the integral bracket 188 affording pivotal connection as at 190 to the link 192, the opposite end of which may have pivotal connection as at 194 with the paired hangers 196, 196 (Figure 4), the upper ends of which may be pivotally hung as at 198 from the inturned end 200 of the bracket 152. Also connected at the lower end of the hanger 196 may be the brake head 202 supporting the composition brake shoe 204 for engagement with the adjacent periphery of the brake drum 206 supported from the adjacent wheel and axle assembly 18. As illustrated, my invention comprehends the use of either composition brake shoes or metal brake shoes for either or both wheel tread and drum surfaces, but in the modification illustrated the lever ratios contemplate composition shoes against the brake drum at 78 and 204.

To those skilled in the art it will be apparent that I have provided an arrangement wherein variation of lever ratios permit the braking forces to be applied at opposite sides of the axle equally or in any reasonable desired ratio and, furthermore, within reasonable limits permit variation of the ratio of braking forces on the tread shoes and the drum shoes to secure such braking conditions as may be desired. As illustrated, it will be noted that the braking force at the side of the axle where both types of brake shoes are mounted is equalized between the composition shoe and the metal shoe, and the brake head supporting the composition shoe is supported from the brake beam in a sort of universal joint arrangement in order to permit the composition brake shoe to bear with equalized pressure against the brake drum under operative conditions which involve both vertical and lateral movements.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a truck frame, spaced supporting wheel and axle assemblies carrying a brake drum adjacent each wheel, power means at each side of the frame, and braking means for each assembly comprising live truck levers operatively connected to the adjacent power means, dead truck levers at the opposite side of the assembly, connections between the live and dead truck levers at each end of the assembly, relatively large metal wheel-engaging brake shoes operatively connected to said live truck levers, equalizers connected at intermediate points to said dead truck levers respectively, relatively small wheel-engaging metal brake shoes supported from corresponding ends of said equalizers, a brake beam supported between the other corresponding ends of said equalizers, and composition brake shoes supported from opposite ends of said beam in braking engagement with drums at opposite ends of the adjacent assembly.

2. In a brake arrangement for a railway car truck, a truck frame, spaced supporting wheel and axle assemblies carrying a brake drum adjacent each wheel, power means at each side of the frame, and braking means for each assembly comprising live truck levers operatively connected to the adjacent power means, dead truck levers at the opposite side of the assembly, connections between the live and dead truck levers at each end of the assembly, relatively large metal wheel-engaging brake shoes operatively connected to said live truck levers, equalizers connected at intermediate points to said dead truck levers respectively, relatively small wheel-engaging metal brake shoes supported from corresponding ends of said equalizers, a brake beam supported between the other corresponding ends of said equalizers, and a composition brake shoe supported from said brake beam for each of the adjacent drums.

3. In a brake arrangement for a railway car truck, a truck frame, spaced supporting wheel and axle assemblies carrying a brake drum adjacent each wheel, power means at each side of the frame, and braking means for each assembly comprising live truck levers operatively connected to the adjacent power means, dead truck levers at the opposite side of the assembly, connections between the live and dead truck levers at each end of the assembly, a wheel-engaging brake shoe connected to the lower ends of said live truck levers respectively, equalizing means connected to the lower ends of said dead truck levers respectively, a wheel-engaging brake shoe operatively connected to one end of each equalizing means, and a drum-engaging brake shoe connected at the opposite end of each equalizing means, said equalizing means including a brake beam affording support for said drum-engaging brake shoes.

4. In a brake arrangement for a railway car truck, a truck frame, spaced supporting wheel and axle assemblies supporting a brake drum adjacent each wheel, and brake rigging for said truck comprising power means at each side of the truck, interconnected live and dead cylinder levers connected at corresponding ends to said power means, and braking means at adjacent ends of each assembly comprising over-axle connected live and dead brake levers and an operative connection between said live brake lever and the adjacent cylinder lever, each of said braking means comprising a relatively large metal brake shoe engaging the wheel at one side, a relatively small metal brake shoe engaging the wheel at the opposite side thereof, and a composition brake shoe adjacent said relatively small metal shoe and engaging the periphery of the adjacent drum.

5. In a brake arrangement for a railway car truck, a truck frame, spaced supporting wheel and axle assemblies supporting a brake drum adjacent each wheel, and brake rigging for said truck comprising power means at each side of the truck, interconnected live and dead cylinder levers connected at corresponding ends to said power means, and braking means at adjacent ends of each assembly comprising over-axle connected live and dead brake levers and an operative connection between said live brake lever and the adjacent cylinder lever, each of said braking means comprising a relatively large metal brake shoe engaging the wheel at one side, a relatively small metal brake shoe engaging the wheel at the opposite side thereof, and a composition brake shoe adjacent said relatively small metal shoe in braking engagement with the adjacent drum.

6. In a brake arrangement for a railway car truck, a frame, spaced supporting wheel and axle assemblies carrying drums adjacent respective wheels, power means at each side of the truck, interconnected live and dead cylinder levers connected at opposite ends of said power means respectively, and braking means at each end of the truck operatively connected to the adjacent cylinder levers, each of said braking means comprising interconnected live and dead truck levers adjacent each wheel, a wheel engaging metal brake shoe supported from one of said truck levers, and an equalizer supported from the other of said truck levers, a wheel-engaging metal brake shoe supported at one end of said equalizer, a brake beam supported at the opposite end of said equalizer, and a composition drum-engaging brake shoe operatively connected to said beam.

7. In a brake arrangement for a railway car truck, a frame, spaced supporting wheel and axle assemblies carrying drums adjacent respective wheels, power means at each side of the truck, interconnected live and dead cylinder levers connected at opposite ends of said power means respectively, and braking means at each end of the truck operatively connected to the adjacent cylinders levers, each of said braking means comprising beamless rigging at one side of the wheels supporting a relatively large wheel-engaging brake shoe, and duplex rigging at the opposite side of the wheels, said duplex rigging comprising brake heads and brake shoes supported for engagement with the peripheries of adjacent wheels and drums respectively, and an operative equalizing connection between the brake shoes at each end of the assembly.

8. In a brake arrangement for a railway car truck, a truck frame, spaced supporting wheel and axle assemblies carrying brake drums adjacent each wheel, power means at each side of the frame, and braking means for each assembly comprising live truck levers operatively connected to the adjacent power means, dead truck levers at the opposite side of the assembly, connections between the live and dead truck levers at each end of the assembly, a wheel-engaging brake shoe connected to the lower ends of said live truck levers respectively, equalizing means connected to the lower ends of said dead truck levers respectively, a wheel-engaging brake shoe operatively connected to one end of each equalizing means, and a drum-engaging brake shoe connected at the opposite end of each equalizing means.

9. In a brake arrangement for a railway car truck, a frame, spaced supporting wheel and axle assemblies carrying brake drums adjacent each wheel, duplex braking means for each end of each assembly including interconnected live and dead levers at opposite sides thereof, and power means at each side of said frame operatively and adjustably connected between the adjacent live levers, each of said braking means comprising a relatively large metal brake shoe engaging the adjacent wheel at one side thereof and a plurality of brake shoes at the opposite side of the assembly engaging respectively the opposite periphery of the wheel and the periphery of the adjacent drum, one of said last-mentioned brake shoes having a metal braking surface and the other having a composition braking surface.

10. In a brake arrangement for a railway car truck, a frame, spaced supporting wheel and axle assemblies carrying brake drums adjacent each wheel, duplex braking means for each end of each assembly including interconnected live and dead levers at opposite sides thereof, and power means at each side of said frame operatively connected between the adjacent live levers, each of said braking means comprising a relatively large metal brake shoe engaging the adjacent wheel at one side thereof and a plurality of brake shoes at the opposite side of the assembly engaging respectively the opposite periphery of the wheel and the periphery of the adjacent drum, one of said last-mentioned brake shoes having a metal braking surface and the other having a composition braking surface.

11. In a brake arrangement for a railway car truck, a frame, spaced supporting wheel and axle assemblies carrying brake drums adjacent each wheel, duplex braking means for each end of each assembly including interconnected live and dead levers at opposite sides thereof, and power means at each side of said frame operatively connected between the adjacent live levers, each of said braking means comprising a relatively large metal brake shoe supported from the adjacent live brake lever, an equalizer supported from the adjacent dead brake lever, a relatively small metal brake shoe operatively connected to one end of said equalizer, and a composition brake shoe operatively connected to the other end thereof for engagement with the adjacent drum.

12. A duplex brake arrangement for a wheel and axle assembly having brake drums adjacent each wheel comprising interconnected live and dead levers adjacent each wheel, wheel-engaging shoes operatively connected to corresponding levers at one side of said assembly, wheel and drum engaging shoes operatively connected to corresponding levers at the opposite side of said assembly, and means for equalizing between the drum-engaging shoes and the wheel-engaging shoes, said equalizing means including equalizers connected at intermediate points to the adjacent levers respectively, a brake beam connected between corresponding ends of said equalizers, and wheel engaging brake shoes supported from the other corresponding ends of said equalizers.

13. In a brake arrangement for a railway car truck, a truck frame, spaced supporting wheel and axle assemblies supporting a brake drum adjacent each wheel, and brake rigging for said truck comprising power means at each side of the truck, interconnected live and dead cylinder levers connected at corresponding ends to said power means, and braking means at adjacent ends of each assembly comprising over-axle connected live and dead brake levers and an operative connection between said live brake lever and the adjacent cylinder lever, said braking means comprising metal brake shoes engaging the opposite peripheries of the wheel and a composition brake shoe engaging the adjacent drum.

14. In a brake arrangement for a railway car truck, a frame, spaced supporting wheel and axle assemblies carrying brake drums adjacent each wheel, duplex braking means for each end of each assembly including interconnected live and dead levers at opposite sides thereof, and power means at each side of said frame operatively and adjustably connected between the adjacent live levers, each of said braking means comprising a relatively large metal brake shoe engaging the adjacent wheel at one side thereof and a plurality of brake shoes at the opposite side of the assembly engaging respectively the opposite periphery of the wheel and the periphery of the adjacent drum.

15. In a brake arrangement for a railway car truck, a frame, spaced supporting wheel and axle assemblies carrying drums adjacent respective wheels, power means at each side of the truck, interconnected live and dead cylinder levers connected at opposite ends of said power means respectively, and braking means at each end of the truck operatively connected to the adjacent cylinder levers, each of said braking means comprising beamless rigging at one side of the wheels supporting a relatively large wheel-engaging brake shoe, and duplex rigging at the opposite side of the wheels, said duplex rigging including brake shoes engaging the wheels and drums at each side of the truck.

16. A duplex brake arrangement for a wheel and axle having a brake drum adjacent each wheel comprising clasp brake means engaging opposite sides of each wheel and single shoe brakes engaging one side of each drum, and an equalizing connection between said wheel brakes and drum brakes at one side of said assembly, said equalizing connection comprising vertical equalizers at each end of the assembly respectively connected intermediate their ends to actuating means, a brake beam pivotally connected to corresponding ends of said equalizers, drum-engaging shoes actuated from said brake beam, and wheel-engaging shoes supported from the opposite ends of said equalizers respectively, said brake beam being supported in a plane approximately at right angles to the plane of said equalizers.

17. A duplex brake arrangement for a wheel and axle assembly having brake drums adjacent each wheel comprising interconnected live and dead levers adjacent each wheel, wheel-engaging shoes operatively connected to corresponding levers at one side of said assembly, wheel and drum engaging shoes operatively connected to corresponding levers at the opposite side of said assembly, and means for equalizing between the drum-engaging shoes and the wheel-engaging shoes, said equalizing means including equalizers connected at intermediate points to the adjacent levers respectively, and a brake beam connected between corresponding ends of said equalizers.

18. In a brake arrangement for a railway car truck, a frame, spaced supporting wheel and axle assemblies carrying brake drums adjacent each wheel, duplex braking means for each end of each assembly including interconnected live and dead levers at opposite sides thereof, and power means at each side of said frame operatively connected between the adjacent live levers, each of said braking means comprising a relatively large metal brake shoe engaging the adjacent wheel at one side thereof and a plurality of brake shoes at the opposite side of the assembly engaging respectively the opposite periphery of the wheel and the periphery of the adjacent drum.

19. A duplex brake arrangement for a wheel and axle assembly having brake drums adjacent each wheel comprising interconnected live and dead levers at opposite sides of said assembly, wheel-engaging shoes operatively connected to corresponding levers at one side of said assembly, wheel and drum engaging shoes operatively connected to corresponding levers at the opposite side of said assembly, and means for equalizing between the drum-engaging shoes and the wheel-engaging shoes.

20. A duplex brake arrangement for a wheel and axle assembly having brake drums adjacent each wheel comprising interconnected live and dead levers at opposite sides of each wheel, wheel-engaging shoes operatively connected to corresponding levers at one side of said assembly, and wheel and drum engaging shoes operatively connected to the other of said levers at the opposite side of said assembly.

21. A duplex brake arrangement for a wheel and axle having a brake drum adjacent each wheel comprising clasp brake means engaging opposite sides of each wheel and single shoe brakes engaging one side of each drum, and an equalizing connection between said wheel brakes and drum brakes at one side of said assembly, each of said equalizing connections comprising a vertical equalizer pivotally supported from actuating means, pivotally connected at one end to a brake beam projecting approximately at a right angle therefrom, and supporting at its other end wheel engaging means.

22. A brake lever structure comprising pivotally connected rigid supporting and supported members, said supporting member having an intermediate trunnion and a bifurcated portion therebelow, and said supported member being mounted intermediate the legs of said bifurcated portion, said supported member having an upper trunnion end affording connection to an associated beam and pivotally supporting wheel engaging means at its lower end.

23. A brake lever structure comprising pivotally connected rigid supporting and supported members, said supporting member having an intermediate trunnion and a bifurcated portion therebelow and said supported member being mounted intermediate the legs of said bifurcated portion, said supported member having an upper trunnion end affording connection to an associated beam and pivotally and adjustably supporting wheel braking means at its lower end.

24. A duplex brake arrangement for a wheel and axle assembly having a brake drum intermediate the wheels comprising interconnected live and dead levers at opposite sides of each wheel, wheel engaging shoes operatively connected to corresponding levers at one side of said assembly, and wheel and drum engaging shoes operatively connected to the other of said levers at the opposite side of said assembly.

25. A duplex brake arrangement for a wheel and axle assembly having a brake drum intermediate the wheels comprising interconnected live and dead levers at opposite sides of each wheel, wheel engaging shoes operatively connected to corresponding levers at one side of said assembly, wheel and drum engaging shoes operatively connected to the other of said levers at the opposite side of said assembly, said last-mentioned operative connection comprising vertical equalizers pivotally mounted adjacent respective ends of said assembly and connected to actuating means, and a brake beam connected intermediate said equalizers for support of certain of said shoes.

26. A duplex brake arrangement for a wheel and axle assembly having a brake drum intermediate the wheels comprising interconnected live and dead levers at opposite sides of each wheel, wheel engaging shoes operatively connected to corresponding levers at one side of said assembly, wheel and drum engaging shoes operatively connected to the other of said levers at the opposite side of said assembly, said last-mentioned operative connection comprising vertical equalizers pivotally mounted adjacent respective ends of said assembly and connected to actuating means, and a brake beam connected intermediate said equalizers for support of certain of said shoes, other of said shoes being mounted on said equalizers.

27. A duplex brake arrangement for a wheel and axle assembly having a brake drum intermediate the wheels comprising interconnected live and dead levers at opposite sides of each wheel, wheel engaging shoes operatively connected to corresponding levers at one side of said assembly, wheel and drum engaging shoes operatively connected to the other of said levers at the opposite side of said assembly, said last-mentioned operative connection comprising vertical equalizers pivotally mounted adjacent respective ends of said assembly and connected to actuating means, a brake beam connected intermediate said equalizers for support of certain of said shoes, and spaced hangers supporting said beam.

RAYMOND C. PIERCE.